United States Patent
Junkins

(10) Patent No.: US 6,650,324 B1
(45) Date of Patent: Nov. 18, 2003

(54) DEFINING SURFACE NORMALS IN A 3D SURFACE MESH

(75) Inventor: Stephen Junkins, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/429,876

(22) Filed: Oct. 29, 1999

(51) Int. Cl.$^7$ ................................................ G06T 17/20
(52) U.S. Cl. ........................ 345/423; 345/428; 345/427; 345/441; 345/582; 345/619
(58) Field of Search ................................ 345/423, 441, 345/419, 426, 420, 427, 428, 440, 581, 582, 589, 619

(56) References Cited

U.S. PATENT DOCUMENTS

| | | | |
|---|---|---|---|
| 4,600,919 A | | 7/1986 | Stern |
| 5,124,914 A | * | 6/1992 | Grangeat |
| 5,163,126 A | * | 11/1992 | Einkauf et al. |
| 5,731,819 A | | 3/1998 | Gagne et al. |
| 6,057,859 A | | 5/2000 | Handelman et al. |
| 6,208,347 B1 | * | 3/2001 | Migdal et al. |
| 6,337,880 B1 | | 1/2002 | Cornog et al. |
| 6,388,670 B2 | | 5/2002 | Naka et al. |

OTHER PUBLICATIONS

Foley et al., "Computer graphics: principal and practice" Addison–Wesley Publishing Company, 1060–1064, Reading, MA 1996.
Hoppe, "Progressive Meshes" Microsoft Research, 99–108, http://www.research.microsoft.com/research/graphics/hoppe/.
Popovic "Progressive Simplicial Complexes" Microsoft Research, http://www.research.microsft.com/~hoppe/.
Hoppe "Efficient Implementation of progressive meshes" Coput. & Graphics vol. 22, No. 1, pp. 27–36, 1998.
Taubin et al., "Progressive Forest Spilt Compression" IBM T.J. Watson Research Center, Yorktown Heights, NY.
Cohen–Or et al., "Progressive Compression of Arbitrary Triangular Meshes" Computer Science Department, School of Mathematical Sciences, Tel Aviv, Israel.
Bajaj et al., "Progressive Compression and Transmission of Arbitrary Triangular Meshes" Department of Computer Sciences, University of Texas at Austin, Austin, TX.
Pajarola et al., "Compressed Progressive Meshes" Graphics, Visualization & Usability Center, College of Computing, Georgia Institute of Technology, Jan. 1999.
Alliez et al., "Progressive Compression for Lossless Transmission of Triangle Meshes" University of Southern California, Los Angeles, CA, 195–202.
Chow "Optimized Geometry Compression for Real–time Rendering" Massachusetts Institute of Technology, Proceedings Visualization 1997, Oct. 19–24, 1997, Phoenix, AZ, 347–354.

(List continued on next page.)

*Primary Examiner*—Mark Zimmerman
*Assistant Examiner*—Kimbinh T. Nguyen
(74) *Attorney, Agent, or Firm*—Fish & Richardson P.C.

(57) ABSTRACT

In rendering an image of a 3D surface, a computer system obtains a digital model that includes data points defining vertices for triangles that represent 2D faces of the 3D surface. The computer also obtains a plurality of vectors, each defining a surface normal for the 3D surface at a corresponding one of the vertices. The computer applies an algorithm, such as, Loop's Equation, to the data points to create new data points defining new vertices that subdivide the triangles into smaller triangles. The computer applies the same algorithm to the vectors to calculate new vectors, each defining a surface normal at a corresponding one of the new vertices.

24 Claims, 3 Drawing Sheets

OTHER PUBLICATIONS

Markosian "Real–Time Nonphotorealistic Rendering" Brown University site of the NSF Science and Technology Center for Computing Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "SKETCH: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Application, 29–37, 1995.

Raskar "Image Precision Silhouette Edges" University of North Carolina at Chapel Hill, Microsoft Research, 1999 Symposium on Interactive 3D Graphics Atlanta, GA, 135–231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Lewis "Pose Space Deformation: A Unified Approach to Shape Interpolation and Skeleton–Driven Deformation" Centropolis, New Orleans, LA, 165–172.

Lasseter "Principles of Traditional Animation Applied to 3D Computer Animation" Pixar, San Rafael, California, 1987.

Thomas (Contributor) et al., "The Illusion of Life: Disney Animation" 47–51.

\* cited by examiner

DEFINING SURFACE NORMALS IN A 3D SURFACE MESH

TECHNOLOGICAL FIELD

This application relates to creating and rendering 3D surfaces in a computer system.

BACKGROUND

Many computer graphics applications render complex three-dimensional (3D) surface geometries by iteratively refining simple, coarse 3D geometries, known as "base meshes." In general, each base mesh is a collection of triangle faces, in which trios of adjacent points, or vertices, are connected to form an approximation of a 3D surface. This approximation represents a coarse approximation of a more complex, ideal 3D surface, known as a "limit subdivision surface," or "limit surface."

A computer creates an initial "subdivision surface" from a base mesh by applying a computational kernel, known as a "subdivision kernel," to the triangles and vertices in the base mesh. Repeated and recursive application of the subdivision kernel yields increasingly smooth meshes that converge at the limit surface as the number of iterations approaches infinity.

Producing a subdivision surface typically involves computing a weighted midpoint between each pair of vertices in each triangle (i.e., along each edge in the mesh) and then connecting the midpoints, or "tessellating" the triangle, to create four smaller triangles. The time required to subdivide a 3D surface mesh depends upon the technique used in tessellating the triangles in the mesh. More efficient tessellation techniques reduce processing time and therefore improve rendering speed.

In rendering 3D surfaces, computers must often calculate surface normal vectors to ensure realistic light shading of the surfaces. Simple lighting models use the angle between a surface normal vector and a vector in the direction of the light source to calculate how much light strikes the surface at a corresponding vertex. In general, the computer must compute a surface normal vector for each new vertex produced in the subdivision surface computations. As with tessellation, more efficient surface normal calculation reduces processing time and therefore improves rendering speed.

SUMMARY

In rendering an image of a 3D surface, a computer system obtains a digital model that includes data points defining vertices for triangles that represent 2D faces of the 3D surface. The computer also obtains a plurality of vectors, each defining a surface normal for the 3D surface at a corresponding one of the vertices. The computer applies an algorithm, such as a Butterfly Subdivision Scheme, to the data points to create new data points defining new vertices that subdivide the triangles into smaller triangles. The computer applies the same algorithm to the vectors to calculate new vectors, each defining a surface normal at a corresponding one of the new vertices.

Other embodiments and advantages will become apparent from the following description and from the claims.

DETAILED DESCRIPTION

The techniques described here are more computationally efficient that conventional surface normal calculation techniques. As described in detail below, these techniques are an order of magnitude more efficient, in terms of both floating point operations and processing cycles, than conventional surface normal calculation techniques. The described techniques also yield surface normal vectors that precisely follow the smoothness of the subdivision surfaces. These techniques lend themselves to efficient implementation with hardware components. A single set of gates can be used to perform both subdivision of the 3D surface mesh and surface normal calculation.

Figure 1:
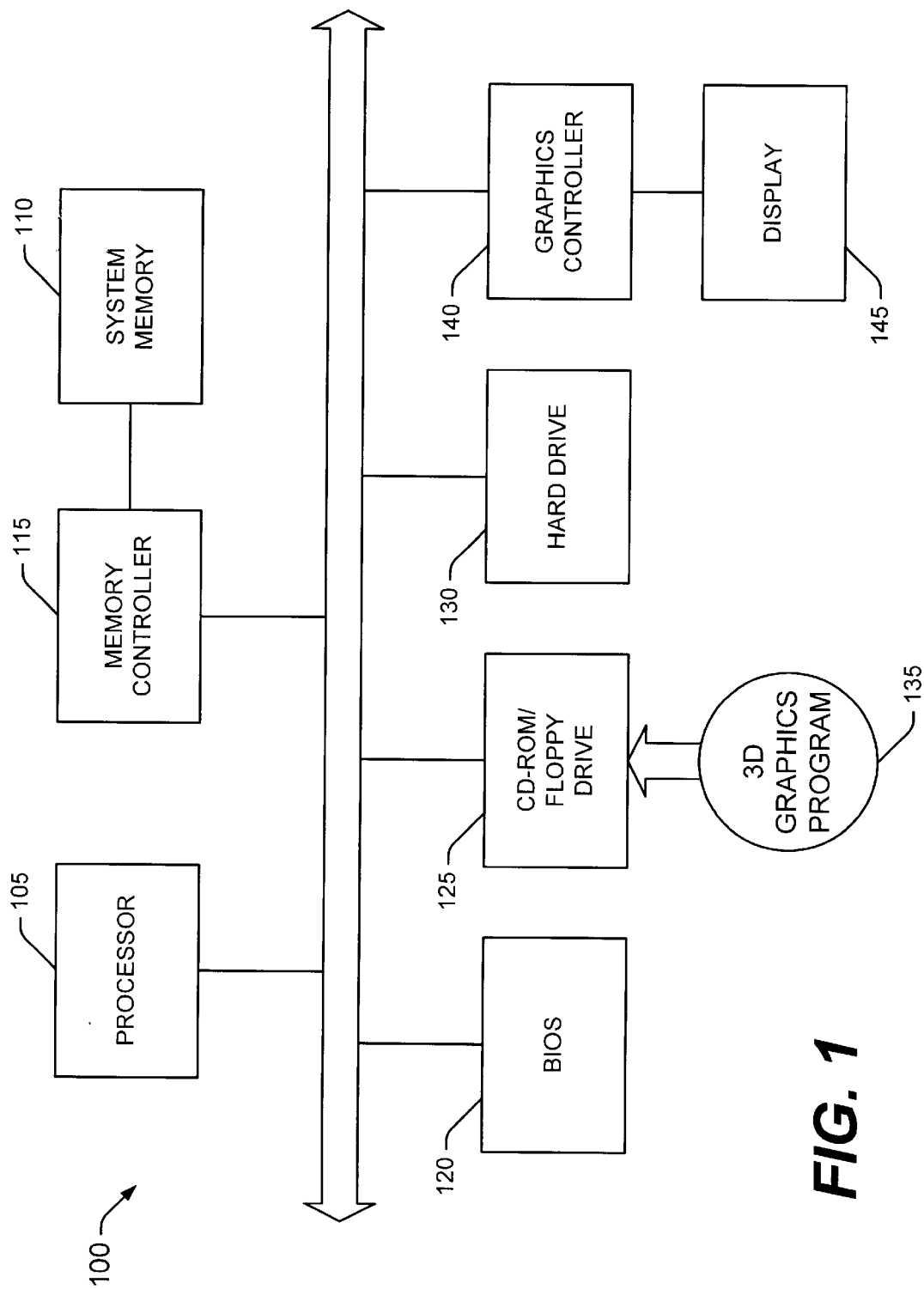
FIG. 1 is a block diagram of a computer system.

FIG. 1 shows a computer system 100 configured for use in 3D surface generating and rendering applications. The computer includes at least one central processor 105 that performs the operations necessary to generate and render 3D surfaces. In most systems, the processor 105 includes or has access to cache memory (not shown), which provides a temporary storage area for data accessed frequently by the processor 105. The computer also includes system memory 110, which stores program instructions and data needed by the processor 105. System memory 110 often includes one or more volatile memory devices, such as dynamic random access memory (DRAM). A memory controller 115 governs the processor's access to system memory 110.

The computer also includes various input and output components, such as a basic input/output system (BIOS) 120, a CD-ROM or floppy disk drive 125, and a hard disk drive 130. A 3D graphics program 135, such as a finite element analysis program or a cartography program loaded into the CD-ROM/floppy drive 125 or the hard drive 130, provides program instructions for execution by the processor 105 in generating 3D images. The 3D graphics program 135 includes instructions for implementing a subdivision surface generator, which allows the processor 105 to create a refined 3D surface from a base mesh that represents a coarse approximation of a limit surface. A graphics controller 140 receives data representing the 3D surfaces from the processor and renders 3D images on a display device 145, such as a cathode ray tube (CRT) display or a liquid crystal diode (LCD) display.

Figure 2:
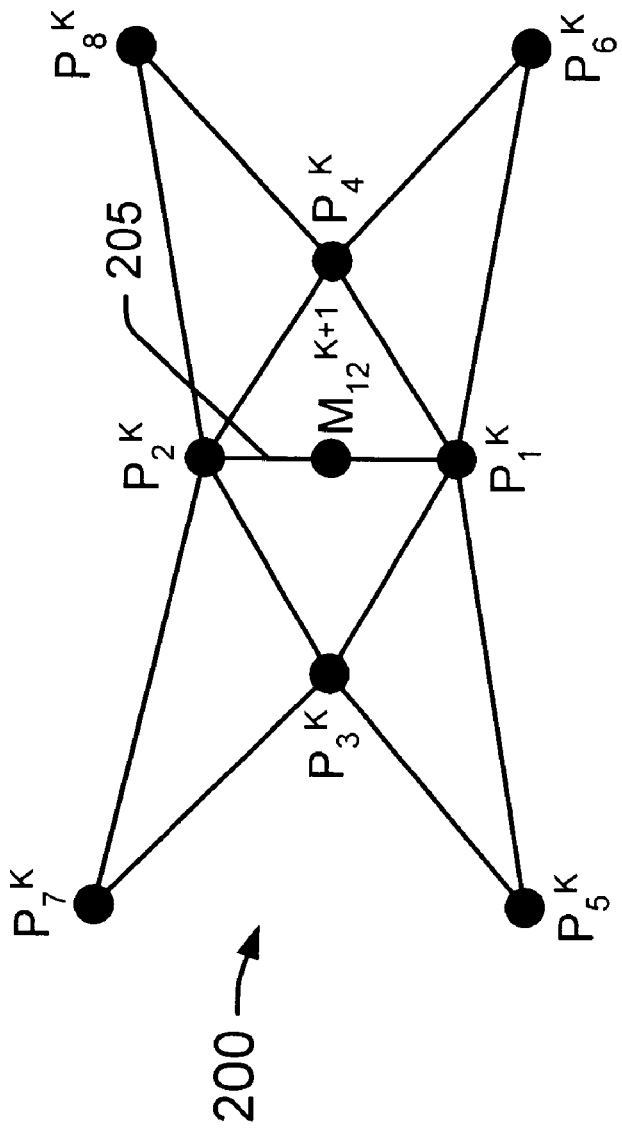
FIG. 2 illustrates the Butterfly Subdivision Scheme.

FIG. 2 illustrates one subdivision technique, known as the "Butterfly Subdivision Scheme," for use by the subdivision surface generator in refining a 3D surface mesh. This technique involves defining a local neighborhood 200 for each edge 205 in the mesh at a $k^{th}$ subdivision surface, where k=0 for the base mesh, and then calculating a midpoint ($m^{k+1}$) along the edge. Each neighborhood 200 includes eight vertices ($p_1^k$–$p_8^k$) defining six triangles arranged in a butterfly-shaped pattern. The computer applies a linear equation to the eight vertices in the neighborhood 200 to define the location of the midpoint $m^{k+1}$ in the $k+1^{th}$ subdivision surface. In general, the computer repeats this process for every edge in the mesh.

In the example shown here, the computer subdivides the Is edge 205 defined by the vertices $p_1^k$ and $p_2^k$ according to the following equation:

$$m^{k+1} = \tfrac{1}{2}(p_1^k + p_2^k) + 2w(p_3^k + p_4^k) - w(p_5^k + p_6^k + p_7^k + p_8^k),$$

where w is a constant, known as the "global tension parameter," that controls the degree to which the subdivision kernel smoothes the surface. Therefore, the midpoint $m^{k+1}$ represents a simple linear combination, in the form of a weighted average, of the vertices $p_1^k$–$p_8^k$ in the local neighborhood 200. The weighting factors in the equation are selected to emphasize the vertex connectivity that most influences the local smoothness of the mesh at each midpoint.

Figure 3:
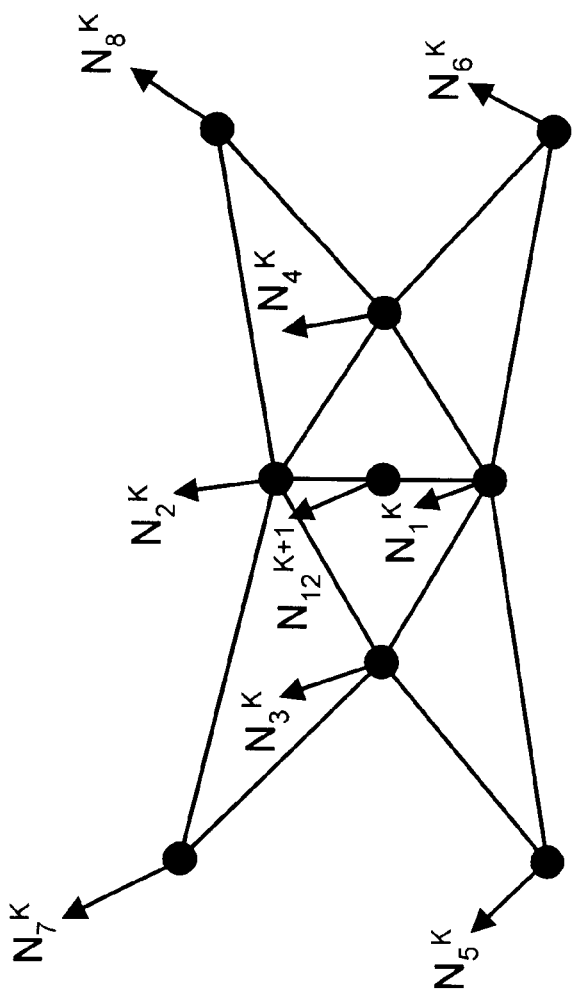
FIG. 3 illustrates a technique for calculating surface normals when subdividing a 3D surface mesh.

The computer completes the k+1$^{th}$ subdivision surface by defining a butterfly-shaped neighborhood around each edge in the k$^{th}$ subdivision surface, applying the equation above to each neighborhood to define a corresponding midpoint, and triangulating, or tessellating, the k$^{th}$ subdivision surface by connecting the newly-defined midpoints. FIG. 3 shows a tessellated triangle 210, in which the midpoints $m_{12}^{k+1}$, $m_{13}^{k+1}$, and $m_{13}^{k+1}$ between the pairs of vertices $p_1^k$–$p_2^k$, $p_1^k$–$p_3^k$, and $p_2^k$–$p_3^k$, respectively, are connected to create four smaller triangles 215, 220, 225, 230. Using the Butterfly Subdivision Scheme to subdivide a 3D surface model is described in more detail in Dyn, N., Levin, D., and Gregory, J. A., "A Butterfly Subdivision Scheme for Surface Interpolation with Tension Control," ACM Transactions on Graphics 9, 2 (1990).

FIG. 3 illustrates a technique for calculating surface normal vectors when subdividing a 3D surface mesh. This technique is useful, for example, in computing light shading effects for a rendered image of the 3D surface mesh. This technique involves using the same equation given above to calculate the surface normal vectors ($n_1^k$–$n_8^k$) for each of the eight vertices in a butterfly-shaped neighborhood around an edge. In particular, the surface normal vector $n^{k+1}$ for a subdivision midpoint $m^{k+1}$ on a particular edge is calculated according to the following equation:

$$n^{k+1} = \tfrac{1}{2}(n_1^k + n_2^k) + 2w(n_3^k + n_4^k) - w(n_5^k + n_6^k + n_7^k + n_8^k),$$

where w is the "global tension parameter" defined above.

Applying this equation in this manner accurately yields the surface normal vectors because each surface normal vector is an expression of surface smoothness at a particular vertex in the 3D surface mesh. Like the vertices, the surface normal vectors are defined as (X, Y, Z) vectors in three-dimensional space. In some implementations, the vertices of the subdivision surface and the corresponding surface normal vectors are computed simultaneously by inserting 6-dimensional vectors ($X_1$, $Y_1$, $Z_1$, $X_2$, $Y_2$, $Z_2$) into the subdivision equation. This technique is even more efficient when the computer expresses the surface normals as vectors of unit length and defines the vectors in two-dimensional, spherical coordinates ($\phi$, $\theta$) Expressing the surface normals in spherical coordinates allows the use of 5-dimensional vectors in the equation above and thus further simplifies the computation.

Empirical evidence suggests that certain computers can calculate a surface normal vector using this butterfly subdivision technique in approximately 20 floating point operations, or 40 processing cycles. One conventional surface normal calculation technique involves calculating the cross-products of the normals of all triangles that share a vertex, and then averaging the cross-products to derive a surface normal for the vertex. This technique requires approximately 107 floating point operations, 6 square root operations, and 21 divide operations, for a total of approximately 1294 processing cycles. Another conventional technique involves performing an eigenanalysis of the subdivision kernel to yield two eigenvectors, and then multiplying these eigenvectors against a matrix representing the local vertex neighborhood. The resulting surface tangent vectors are then cross-multiplied to produce a surface normal vector for the midpoint. This technique requires approximately 224 floating point operations, one square root operation, and three divide operations, for a total of approximately 614 processing cycles. Therefore, in certain computers, the butterfly technique described here is more than 15 times more efficient than one of these conventional techniques and more than 30 times more efficient than the other of these conventional techniques.

A number of embodiments of the invention are described above. A person of ordinary skill will recognize that various modifications are possible without departing from the spirit and scope of the invention. For example, while the invention has been described in terms of the Butterfly Subdivision Scheme, it is useful with other subdivision schemes, such as Loop's scheme, as well. Moreover, while the invention has been described in terms of a programmable computer executing program instructions, other implementations are realized in discrete digital components, in application specific integrated circuits (ASICs), and in some combination of these technologies. Accordingly, other embodiments are within the scope of the following claims.

What is claimed is:

1. A computer-implemented method for use in rendering an image of a 3D surface, the method comprising:

obtaining a digital model of the 3D surface, where the digital model includes data points defining vertices for triangles that represent 2D faces of the 3D surface;

obtaining a plurality of vectors, each defining a surface normal for the 3D surface at a corresponding one of the vertices;

applying a computer-implemented algorithm to the data points to create new data points defining new vertices that subdivide the triangles into smaller triangles; and applying the same computer-implemented algorithm to the vectors to calculate new vectors, each defining a surface normal at a corresponding one of the new vertices, wherein applying the computer-implemented algorithm includes applying the following equation:

$$m^{k+1} = \tfrac{1}{2}(z_1^k + z_2^k) + 2w(z_3^k + z_4^k) - w(z_5^k + z_6^k + z_7^k + z_8^k),$$

where each $Z_n$ represents one of the data points or vectors, where k indicates how many times the digital model of the 3D surface has been subdivided, and where w is a constant.

2. The method of claim 1, further comprising using the surface normals to calculate a shading pattern in the rendered image.

3. The method of claim 1, wherein the constant w indicates an amount by which the 3D surface is smoothed during each subdivision of the digital model.

4. The method of claim 1, wherein applying the computer-implemented algorithm to the data points includes:

obtaining coordinates for a group of the vertices that together define a neighborhood of triangles; and inserting the coordinates into a predetermined equation to calculate coordinates for a new vertex.

5. The method of claim 1, wherein applying the computer-implemented algorithm to the data points aid to the vectors includes applying the algorithm to both data points and to vectors at one time.

6. The method of claim 1, wherein the vectors define the surface normals in rectangular coordinates.

7. The method of claim 1, wherein the vectors define the surface normals in spherical coordinates.

8. A computer-implemented method for use in rendering an image of a 3D surface, the method comprising:
- obtaining a digital model of the 3D surface, where the digital model includes data points defining vertices for triangles that represent 2D faces of the 3D surface;
- obtaining a plurality of vectors, each defining a surface normal for the 3D surface at a corresponding one of the vertices;
- applying a computer-implemented algorithm to the data points to create new data points defining new vertices that subdivide the triangles into smaller triangles; and
- applying the same computer-implemented algorithm to the vectors to calculate new vectors, each defining a surface normal at a corresponding one of the new vertices;
- wherein applying the computer-implemented algorithm to the data points and to the vectors includes applying the algorithm to both data points and to vectors at one time; and
- creating supervectors, each representing both one of the data points and one of the vectors, wherein applying the computer-implemented algorithm includes inserting the supervectors into a predetermined equation to calculate new supervectors for the new vertices.

9. A storage medium that stores executable instructions to render an image of a 3D surface, the instructions causing a computer to:
- obtain a digital model of the 3D surface, where the digital model includes data points defining vertices for triangles that represent 2D faces of the 3D surface;
- obtain a plurality of vectors, each defining a surface normal for the 3D surface at a corresponding one of the vertices;
- apply a computer-implemented algorithm to the data points to create new data points defining new vertices that subdivide the triangles into smaller triangles; and
- apply the same computer-implemented algorithm to the vectors to calculate new vectors, each defining a surface normal at a corresponding one of the new vertices,
- wherein, in applying the computer-implemented algorithm, the computer applies the following equation:

$$m^{k+1} = \tfrac{1}{2}(z_1^k + z_2^k) + 2w(z_3^k + z_4^k) - w(z_5^k + z_6^k + z_7^k + z_8^k),$$

where each $z_n$ represents one of the data points or vectors, where k indicates how many times the digital model of the 3D surface has been subdivided, and where w is a constant.

10. The storage medium of claim 9, wherein the computer uses the surface normals to calculate a shading pattern in the rendered image.

11. The storage medium of claim 9, wherein the constant w indicates an amount by which the 3D surface is smoothed during each subdivision of the digital model.

12. The storage medium of claim 9, wherein, in applying the computer-implemented algorithm to the data points, the computer:
- obtains coordinates for a group of the vertices that together define a neighborhood of triangles; and
- inserts the coordinates into a predetermined equation to calculate coordinates for a new vertex.

13. The storage medium of claim 9, wherein, in applying the computer-implemented algorithm to the data points and to the vectors, the computer applies the algorithm to both data points and to vectors at one time.

14. The storage medium of claim 9, wherein the vectors define the surface normals in rectangular coordinates.

15. The storage medium of claim 9, wherein the vectors define the surface normals in spherical coordinates.

16. A storage medium that stores executable instructions to render an image of a 3D surface, the instructions causing a computer to:
- obtain a digital model of the 3D surface, where the digital model includes data points defining vertices for triangles that represent 2D faces of the 3D surface;
- obtain a plurality of vectors, each defining a surface normal for the 3D surface at a corresponding one of the vertices;
- apply a computer-implemented algorithm to the data points to create new data points defining new vertices that subdivide the triangles into smaller triangles; and
- apply the same computer-implemented algorithm to the vectors to calculate new vectors, each defining a surface normal at a corresponding one of the new vertices
- wherein, in applying the computer-implemented algorithm to the data points and to the vectors, the computer applies the algorithm to both data points and to vectors at one time; and
- wherein the computer creates supervectors, each representing both one of the data points and one of the vectors, and wherein, in applying the computer-implemented algorithm, the computer inserts the supervectors into a predetermined equation to calculate new supervectors for the new vertices.

17. A computer system comprising:
- a processor and a memory device coupled to a system bus;
- a display device operable to display a rendered image of a 3D surface;
- a graphics controller configured to receive data from the system bus and use the data in rendering the image of the 3D surface on the display device; and
- a 3D graphics program loaded into the memory device to assist the processor in delivering the data to the graphics controller, the 3D graphics program comprising executable instructions that cause the processor to:
  - obtain a digital model of the 3D surface, where the digital model includes data points defining vertices for triangles that represent 2D faces of the 3D surface;
  - obtain a plurality of vectors, each defining a surface normal for the 3D surface at a corresponding one of the vertices;
  - apply a computer-implemented algorithm to the data points to create new data points defining new vertices that subdivide the triangles into smaller triangles; and
  - apply a same computer-implemented algorithm that was applied to the data points to the vectors using values of the vectors in place of vertex values in the computer-implemented algorithm to calculate new vectors, each defining a surface normal at a corresponding one of the new vertices;
- wherein, in applying the computer-implemented algorithm to the data points, the processor (i) obtains coordinates for a group of the vertices that together define a neighborhood of triangles, and (ii) inserts the coordinates into a predetermined equation to calculate coordinates for a new vertex.

18. The system of claim 17, wherein the processor uses the surface normals to calculate a shading pattern in the rendered image.

19. The system of claim 17, wherein, in applying the computer-implemented algorithm to the data points and to the vectors, the processor applies the algorithm to both data points and to vectors at one time.

20. A computer system comprising:
- a processor and a memory device coupled to a system bus;

a display device operable to display a rendered image of a 3D surface;

a graphics controller configured to receive data from the system bus and use the data in rendering the image of the 3D surface on the display device; and a 3D graphics program loaded into the memory device to assist the processor in delivering the data to the graphics controller, the 3D graphics program comprising executable instructions that cause the processor to:

obtain a digital model of the 3D surface, where the digital model includes data points defining vertices for triangles that represent 2D faces of the 3D surface;

obtain a plurality of vectors, each defining a surface normal for the 3D surface at a corresponding one of the vertices;

apply a computer-implemented algorithm to the data points to create new data points defining new vertices that subdivide the triangles into smaller triangles; and apply the same computer-implemented algorithm to the vectors to calculate new vectors, each defining a surface normal at a corresponding one of the new vertices, wherein, in applying the computer-implemented algorithm, the processor applies the following equation:

$$m^{k+1} = \frac{1}{2}(z_1^k + z_2^k) + 2w(z_3^k + z_4^k) - w(z_5^k + z_6^k + z_7^k + z_8^k),$$

where each $z_n$ represents one of the data points or vectors, where k indicates how many times the digital model of the 3D surface has been subdivided, and where w is a constant.

21. The system of claim 20, wherein the constant w indicates an amount by which the 3D surface is smoothed during each subdivision of the digital model.

22. A computer system comprising:

a processor and a memory device coupled to a system bus;

a display device operable to display a rendered image of a 3D surface;

a graphics controller configured to receive data from the system bus and use the data in rendering the image of the 3D surface on the display device; and a 3D graphics program loaded into the memory device to assist the processor in delivering the data to the graphics controller, the 3D graphics program comprising executable instructions that cause the processor to:

obtain a digital model of the 3D surface, where the digital model includes data points defining vertices for triangles that represent 2D faces of the 3D surface;

obtain a plurality of vectors, each defining a surface normal for the 3D surface at a corresponding one of the vertices;

apply a computer-implemented algorithm to the data points to create new data points defining new vertices that subdivide the triangles into smaller triangles; and apply the same computer-implemented algorithm to the vectors to calculate new vectors, each defining a surface normal at a corresponding one of the new vertices;

wherein, in applying the computer-implemented algorithm to the data points and to the vectors, the processor applies the algorithm to both data points and to vectors at one time; and wherein the processor creates supervectors, each representing both one of the data points and one of the vectors, and wherein, in applying the computer-implemented algorithm, the processor inserts the supervectors into a predetermined equation to calculate new supervectors for the new vertices.

23. A computer system comprising:

a processor and a memory device coupled to a system bus;

a display device operable to display a rendered image of a 3D surface;

a graphics controller configured to receive data from the system bus and use the data in rendering the image of the 3D surface on the display device; and a 3D graphics program loaded into the memory device to assist the processor in delivering the data to the graphics controller, the 3D graphics program comprising executable instructions that cause the processor to:

obtain a digital model of the 3D surface, where the digital model includes data points defining vertices for triangles that represent 2D faces of the 3D surface;

obtain a plurality of vectors, each defining a surface normal for the 3D surface at a corresponding one of the vertices:

apply a computer-implemented algorithm to the data points to create new data points defining new vertices that subdivide the triangles into smaller triangles; and apply the same computer-implemented algorithm that was applied to the data points to the vectors using values of the vectors in place of vertex values in the computer-implemented algorithm to calculate new vectors, each defining a surface normal at a corresponding one of the new vertices;

wherein the vectors define the surface normals in rectangular coordinates.

24. A computer system comprising:

a processor and a memory device coupled to a system bus;

a display device operable to display a rendered image of a 3D surface;

a graphics controller configured to receive data from the system bus and use the data in rendering the image of the 3D surface on the display device; and a 3D graphics program loaded into the memory device to assist the processor in delivering the data to the graphics controller, the 3D graphics program comprising executable instructions that cause the processor to:

obtain a digital model of the 3D surface, where the digital model includes data points defining vertices for triangles that represent 2D faces of the 3D surface;

obtain a plurality of vectors, each defining a surface normal for the 3D surface at a corresponding one of the vertices;

apply a computer-implemented algorithm to the data points to create new data points defining new vertices that subdivide the triangles into smaller triangles; and apply the same computer-implemented algorithm that was applied to the data points to the vectors using values of the vectors in place of vertex values in the computer-implemented algorithm to calculate new vectors, each defining a surface normal at a corresponding one of the new vertices;

wherein the vectors define the surface normals in spherical coordinates.

* * * * *